(12) United States Patent
Maurice et al.

(10) Patent No.: US 11,640,628 B2
(45) Date of Patent: May 2, 2023

(54) METHOD OF ORDERING A NEW OPTICAL ARTICLE, A METHOD FOR LAUNCHING PRODUCTION OF A NEW OPTICAL ARTICLE AND AN APPARATUS FOR ORDERING A NEW OPTICAL ARTICLE

(71) Applicant: ESSILOR INTERNATIONAL, Charenton-le-Pont (FR)

(72) Inventors: Sebastien Maurice, Charenton-le-Pont (FR); Daniel Ferreira, Charenton-le-Pont (FR); Frederic Arrouly, Charenton-le-Pont (FR); Stephane Auffray, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 164 days.

(21) Appl. No.: 16/642,033

(22) PCT Filed: Aug. 29, 2018

(86) PCT No.: PCT/EP2018/073262
§ 371 (c)(1),
(2) Date: Feb. 26, 2020

(87) PCT Pub. No.: WO2019/043072
PCT Pub. Date: Mar. 7, 2019

(65) Prior Publication Data
US 2020/0250718 A1    Aug. 6, 2020

(30) Foreign Application Priority Data
Aug. 31, 2017  (EP) .................................... 17306119

(51) Int. Cl.
*G06Q 30/06*     (2023.01)
*G06Q 30/0601*   (2023.01)
(Continued)

(52) U.S. Cl.
CPC ..... *G06Q 30/0601* (2013.01); *G06Q 20/3274* (2013.01); *G07G 1/0081* (2013.01)

(58) Field of Classification Search
CPC ........... G06Q 30/0601; G06Q 20/3274; G07G 1/0081
(Continued)

(56) References Cited

U.S. PATENT DOCUMENTS 5,967,879 A * 10/1999 Gottschald .............. B24B 49/04
                                              451/10
8,115,792 B2    2/2012 Petsch et al.
(Continued)

FOREIGN PATENT DOCUMENTS

WO   WO2012/135115   10/2012
WO   WO2014/131878   9/2014
WO   WO2015/040338   3/2015

OTHER PUBLICATIONS

International Search Report—PCT/EP2018/073262—dated Nov. 22, 2018.
(Continued)

*Primary Examiner* — Daniel A Hess
(74) *Attorney, Agent, or Firm* — Nixon & Vanderhye

(57) ABSTRACT

A method of ordering a new optical article definable based on features of an initial optical article including at least a lens, the method including the following steps: —acquiring an identifier by capturing a marking carried by the lens of the initial optical article; —sending, by an electronic device, the identifier and an order for the new optical article. A corresponding apparatus and a corresponding method for launching production of the new optical article are also described.

14 Claims, 4 Drawing Sheets

(51) Int. Cl.
*G06Q 20/32* (2012.01)
*G07G 1/00* (2006.01)

(58) Field of Classification Search
USPC .................................................. 705/14.23
See application file for complete search history.

(56) References Cited

U.S. PATENT DOCUMENTS

| | | | |
|---|---|---|---|
| 10,359,643 B2* | 7/2019 | Wildsmith | B29D 11/00153 |
| 11,113,487 B2* | 9/2021 | Maurice | G06K 7/1417 |
| 2002/0062255 A1* | 5/2002 | Tanaka | G06Q 30/06 |
| | | | 705/26.1 |
| 2013/0144743 A1* | 6/2013 | Pugh | G01M 11/0278 |
| | | | 705/26.1 |
| 2013/0231941 A1* | 9/2013 | Pham | G16H 70/60 |
| | | | 705/2 |
| 2014/0253707 A1* | 9/2014 | Gangadhar | G02C 13/003 |
| | | | 382/100 |
| 2015/0278927 A1 | 10/2015 | Nakamura et al. | |
| 2015/0288741 A1 | 10/2015 | Stephkov et al. | |
| 2018/0162143 A1* | 6/2018 | Biskop | B33Y 80/00 |
| 2019/0056602 A1* | 2/2019 | Le Saux | G02C 7/028 |
| 2019/0064541 A1* | 2/2019 | Biel | B29D 11/00009 |

OTHER PUBLICATIONS

Pence, "Contact Lens Design & Materials," Contact Lens Spectrum, Feb. 1, 2012, 3 pages.

* cited by examiner

METHOD OF ORDERING A NEW OPTICAL ARTICLE, A METHOD FOR LAUNCHING PRODUCTION OF A NEW OPTICAL ARTICLE AND AN APPARATUS FOR ORDERING A NEW OPTICAL ARTICLE

TECHNICAL FIELD OF THE INVENTION

The invention is concerned with optical articles, comprising for instance a frame and/or an optical lens.

More precisely the invention relates to a method of ordering a new optical article, to a method for launching production of a new optical article and to an apparatus for ordering a new optical article.

BACKGROUND INFORMATION AND PRIOR ART

When an individual had to order a new optical article (e.g. to change frame or to replace a broken lens), he had to go to an optician with information characterizing the current optical lenses.

This solution was not practical as the individual may not always have such information at hand (e.g. when away from home) or may even have lost such information.

This issue also exists when the individual seeks to order the new optical article online: information characterizing current optical lenses has to be input to define the new optical article.

SUMMARY OF THE INVENTION

In this context, the invention provides a method of ordering a new optical article definable based on features of an initial optical article comprising at least a lens, said method comprising the following steps:
    acquiring an identifier by capturing a marking carried by the lens of the initial optical article;
    sending, by an electronic device, the identifier and an (electronic) order for said new optical article.

By referring to an existing optical article (in particular to a lens of this existing optical article), the process of ordering the new optical article is made easier for the individual (or wearer). In particular, by use of the identifier, technical data characterising the lens can be automatically retrieved and thus provided during the process leading to order of the new optical article.

As will be apparent from the examples given below, the identifier and the order can be sent either together (in a single transmission) or separately (at different times).

Possible optional features of this method are as follows:
    the method further comprises a step of proposing at least one service on a display of the electronic device;
    the step of proposing takes place before the step of sending the identifier;
    the step of proposing takes place after the step of sending the identifier;
    said at least one proposed service is determined based on the identifier;
    the step of proposing at least one service includes proposing a plurality of options for delivery or mounting of said new optical article;
    the method further comprises sending additional data defining the new optical article;
    the additional data are indicative of changing features;
    the new optical article is defined based on said changing features and on part of said features of the initial optical article.
    said changing features are determined by input on a user interface of said electronic device;
    said new optical article includes a frame;
    said additional data include data designating said frame;
    the new optical article is identical to the initial optical article;
    the identifier is included in the order;
    the method further comprises a step of receiving the electronic order at a server and/or a step of launching production of said new optical article;
    the initial optical article includes a pair of ophthalmic lenses including said lens, or, as a possible variation, a pair of plano lenses (such as lenses for sunglasses) including said lens;
    said marking is a two-dimension code carried by the lens (or, as a possible variation, a barcode carried by the lens);
    the electronic device is a user terminal, for instance a personal computer or a smartphone.

The invention also provides a method for launching production of a new optical article based on features of an initial optical article comprising at least a lens, the method comprising the following steps:
    receiving, at a server, an order and an identifier acquired by capturing a marking carried by the lens of the initial optical article, and
    launching production of said new optical article on the basis of the received order.

The invention also provides an apparatus for ordering a new optical article based on features of an initial optical article comprising at least a lens), said apparatus comprising an image sensor configured to capture a marking carried by the lens of the initial optical article; a control unit configured to acquire an identifier based on the captured marking; and a communication circuit configured to send the identifier and an order for said new optical article.

Optional features presented above in connection with the proposed method for ordering a new optical article may also apply to this apparatus.

DETAILED DESCRIPTION OF EXAMPLE(S)

The invention will be better understood in light of the appended drawings, where:

Figure 1:
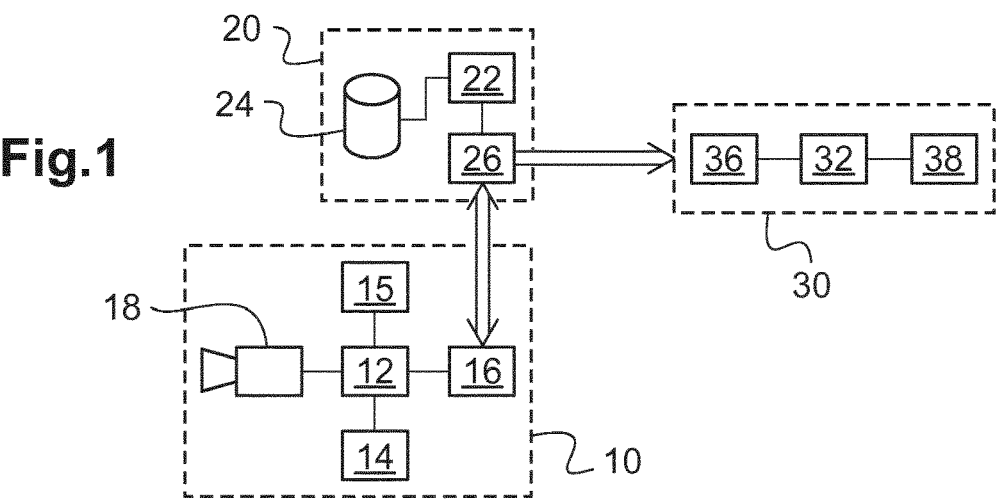
FIG. 1 shows an exemplary system in which the invention may be implemented.

This system comprises a user terminal 10, a remote server 20 and a manufacturing facility 30.

The user terminal 10 is an electronic device connectable to a network, for instance a personal computer, a tablet computer or a smartphone.

The user terminal 10 comprises a control unit 12 (e.g. a microprocessor), a storage unit 14 (e.g. a solid state memory), a user interface 15 (such as a touchscreen), a communication circuit 16 and an image sensor 18.

The storage unit 14 stores computer programs comprising instructions which cause the control unit 12 to implement methods, including the methods described below, when these instructions are executed by the control unit 12.

The remote server 20 comprises a control unit 22, a storage unit 24 storing a database as explained below and a communication interface 26.

The manufacturing facility 30 comprises a computer 32, a communication module 36 and a manufacturing set 38. The manufacturing set 38 is for example a manufacturing machine or a manufacturing line.

The communication circuit 16 of the user terminal 10 and the communication interface 26 of the remote server 20 are designed to exchange data over digital networks, which may include a local area network and/or a wireless telephone network and/or a wide area network (such as the Internet).

Thus, the control unit 12 of the user terminal 10 and the control unit 22 of the remote server 20 can exchange data via the communication circuit 16 and the communication interface 26, for instance as described below.

In a similar fashion, the communication module 36 of the manufacturing facility 30 and the communication interface 26 of the remote server 20 are designed to exchange data over digital networks. The computer 32 of the manufacturing facility 30 and the control unit 22 of the remote server 20 can thus exchange data via the communication interface 26 and the communication module 36, in particular as described below.

Figure 2:
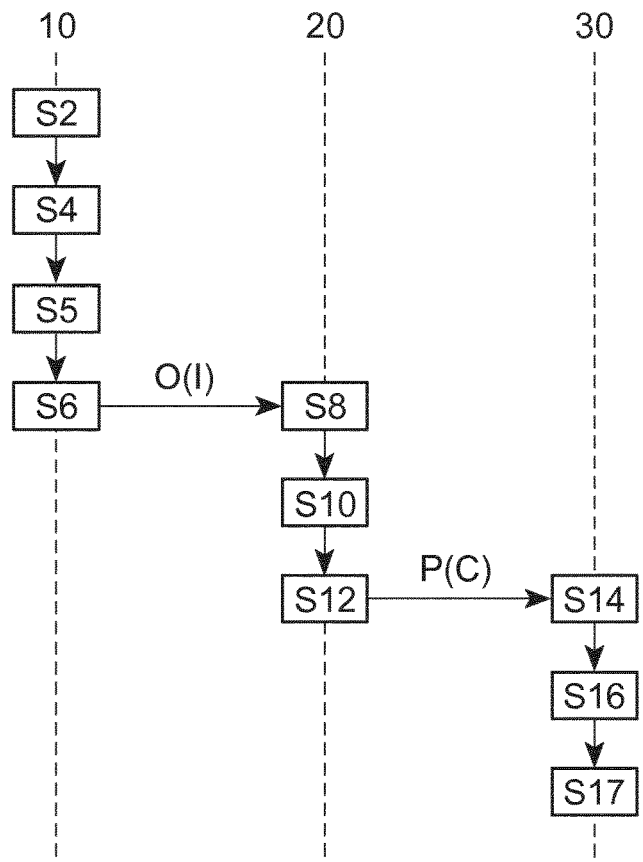
FIG. 2 illustrates the main steps of a method according to a first embodiment of the invention.

FIG. 2 illustrates the main steps of a method according to a first embodiment of the invention.

This method begins at step S2 when a wearer of an initial optical article launches an application for lens renewal on the user terminal 10. This is done for instance by selecting a specific icon on the user interface 15 of the user terminal 10, which triggers execution of the application by the control unit 12 of the user terminal 10.

As a possible variation, the user terminal 10 could connect to a website (under directions from the wearer), for instance a website hosted by the remote server 20.

Figure 3:
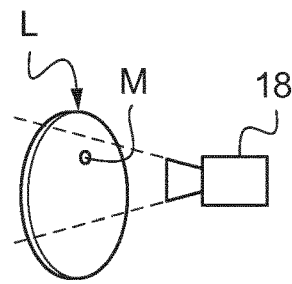
FIG. 3 depicts an image sensor capturing a marking on an optical article.

The image sensor 18 then captures at step S4 a marking M carried by the initial optical article, here an initial ophthalmic lens L that the wearer wants to renew, as depicted in FIG. 3. In a variant, the initial optical article is another type of lens, such as a plano lens.

This step S4 is for instance performed under the control of the control unit 12 executing the application mentioned above, possibly with the help of the wearer directing the image sensor 18 towards the initial optical article L.

The marking M was for instance engraved on the external surface of the optical article (here the ophthalmic lens L) during the manufacturing process of this optical article L. This marking M is for instance produced as described in the patent application published under reference WO 2015/040 338. According to a possible variation, the marking to be captured by the image sensor 18 is internal to the initial ophthalmic lens, such as proposed in the patent application published under reference WO 2014/131 878.

The marking M is representative of an identifier I associated with the initial optical article L. For instance, the marking M may have the form of a two-dimension code, such as a data matrix or a QR code.

Thus, in a step S5, the control unit 12 of the user terminal 10 determines the identifier I based on the captured marking M (using decoding rules of the concerned code).

The control unit 12 can then send a renewal order O (i.e. an electronic order aiming at renewal of the optical article), including the identifier I, to the remote server 20 (using the communication circuit 16) at step S6.

The remote server 20 (precisely the control unit 22 of the remote server 20) receives the renewal order O with the identifier I (via the communication interface 26) at step S8.

The control unit 22 then looks for the identifier I in the database stored in the storage unit 24 and can thus retrieve characteristics C of the initial optical article L (step S10), which characteristics C are stored in this database in correspondence with the identifier I.

These characteristics C are characteristics defining the initial optical article (here the initial lens L). The characteristics C comprises, for example, optical characteristics (such as characteristics defining at least one surface of the lens L, or characteristics defining prescription of the wearer such as spherical power, cylindrical power, cylinder axis) and/or mechanical characteristics (such as dimensions of the lens L, either after edging of the lens L or not) and/or characteristics defining the material of the lens L.

The control unit 22 then sends a message P launching manufacture (said differently, production) of a new optical article (here a new ophthalmic lens) to the manufacturing facility 30 (step S12), precisely to the computer 32 of the manufacturing facility 30 via the communication interface 26 and the communication module 36.

The message P comprises the characteristics C retrieved at step S10 such that the computer 32, which receives the message P (step S14), can instruct the manufacturing set 38 to produce the new optical article (here the new ophthalmic lens) with characteristics identical to the characteristics C of the initial optical article L (step S16), as per the renewal order O of the wearer (see step S6 above).

Once the new optical article (here the new ophthalmic lens) is produced, the computer 32 selects a particular finalization and delivery method (step S17), depending on the concerned optical article (thus possibly, based on some of the characteristics C received with the message P), for instance among the following finalization and delivery methods:

ship to an eye care practitioner (for example an eye care practitioner selected by the wearer, in which case the selected eye care practitioner may be identified in the renewal order O sent from the user terminal 10 to the remote server 20, and then in the message P sent from the remote server 20 to the manufacturing facility 30), this method being suitable when edging of the new optical article is required before mounting the new optical article to a frame;
 ship to the wearer (this method being suitable when the new optical article produced by the manufacturing set 38 can be directly used, i.e. here mounted to the wearer's frame);
 await for the wearer's frame such that the new optical article may be edged and then mounted into the wearer's frame before being shipped back to the wearer.

According to a possible variation of the embodiment just described, the method includes a step of displaying (on the user interface 15 of the user terminal 10) an indication proposing a plurality of options for delivery and/or mounting of the new optical article and a step of receiving (via the user interface 15) a wearer input selecting one of these options for delivery and/or mounting of the new optical article. These steps may be performed before or after the step S6 of sending the renewal order O.

According to this possible variation, the selected option for delivery and/or mounting is transmitted from the user terminal 10 to the remote server 20 (possibly in the renewal order O) and then from the remote server 20 to the manufacturing facility 30 (possibly in the message P) such that the finalization and delivery method used (based on instructions from the computer 32) may effectively correspond to the selected option for delivery and/or mounting.

Figure 4:
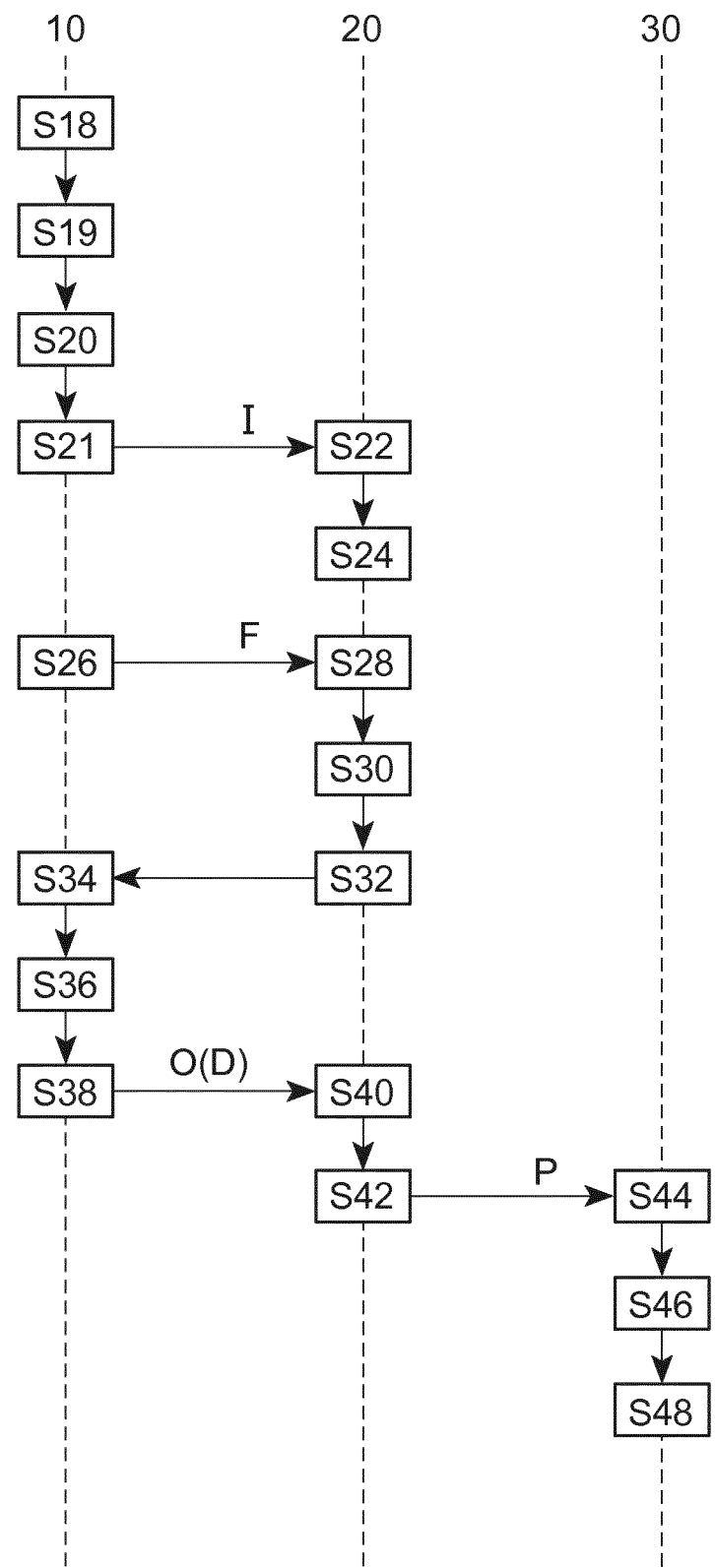
FIG. 4 illustrates the main steps of a method according to a second embodiment of the invention.

FIG. 4 illustrates the main steps of a method according to a second embodiment of the invention.

This method begins at step S18 when a wearer of an initial optical article launches an application (or a website) for reordering the same lens prescription but with a new frame.

At step S19, the image sensor 18 captures a marking M carried by a lens of the initial optical article, here initial spectacles having lens providing a specific correction. As in the first embodiment, the marking M is representative of an identifier I associated with the initial optical article.

The control unit 12 of the user terminal 10 then determines the identifier I based on the captured marking M (step S20).

The identifier I acquired by the user terminal 10 by capturing the marking M is sent to the remote server 20 at step S21.

The remote server 20 (precisely the control unit 22 of the remote server 20) receives the identifier I (via the communication interface 26) at step S22.

The control unit 22 then looks for the identifier I in the database stored in the storage unit 24 and can thus retrieve characteristics C of the initial optical article (step S24), which characteristics C are stored in this database in correspondence with the identifier I.

These characteristics C are for instance characteristics defining ophthalmic lenses carried by the initial optical article. As in the first embodiment, these characteristics may comprise optical characteristics (such as characteristics defining at least one surface of each of the lenses, or characteristics defining prescription of the wearer such as spherical power, cylindrical power, cylinder axis, here for both eyes) and/or mechanical characteristics (such as dimensions of the lenses, either after edging or not) and/or characteristics defining the material of the lenses.

The user terminal 10 (precisely the control unit 12 of the user terminal) also sends data F designating a particular frame to the remote server 20 (step S26).

This particular frame may for instance have been chosen by the wearer among a plurality of possible frames displayed by the user interface 15 of the user terminal 10. In a possible embodiment, images and/or description of the various possible frames may be provided by the remote server 20 to the user terminal 10 (via the communication interface 26 and the communication circuit 16) for display on the user interface 15 of the user terminal 10.

Data F designating the chosen frame are received at the remote server 20 at step S28.

The control unit 22 of the remote server 20 can then determine a set of available lens design options (step S30) based on the characteristics C of the lenses of the initial optical article (and hence, indirectly, based on the identifier I) and on the frame designated by the received data F (frame chosen by the wearer). In this respect, the use of the frame selected by the wearer (and designated by the received data F) may imply necessary changes among the characteristics C (these necessary changes being reflected in the available lens design options).

Available design options may for instance relate to materials available to produce the lens, to coatings available to deposit on the lens, etc. without however altering the optical correction provided by the concerned lens to the wearer (as defined by at least part of the characteristics C).

The determined available lens design options are transmitted from the remote server 20 to the user terminal 10 (step S32) so that these available lens design options may be displayed to the wearer by the user interface 15 of the user terminal 10 (step S34).

In view of the available lens design options, the wearer can select and input (via user interface 15) features (in particular features of the ophthalmic lenses) he or she would like to change compared to the initial optical article (step S36).

The user terminal 10 then sends additional data D indicative of the changing features to the remote server 20 (step S38). These additional data D may for instance be sent in an electronic order O for the new optical article.

The remote server 20 (and as a consequence the control unit 22 of the remote server 20) receives the additional data D indicative of the changing features at step S40.

The control unit 22 can thus send a message P launching manufacture (or production) of at least part of a new optical article (here new spectacles) to the manufacturing facility 30 (step S42), precisely to the computer 32 of the manufacturing facility 30 via the communication interface 26 and the communication module 36.

The message P comprises some of the characteristics C retrieved at step S24 (corresponding to features which were not changed further to the wearer's selection at step S36) and the additional data D indicative of changing features.

The computer 32 receives the message P at step S44 and can instruct the manufacturing set 38 to produce new ophthalmic lenses in accordance with the received characteristics and additional data D indicative of changing features (step S46).

Once the ophthalmic lenses of the new optical article are produced, the computer 32 selects a particular finalization and delivery method (step S48), depending on the concerned optical article and/or on preferences of the wearer (possibly selected by the wearer during step S36, in which case the selected preference may be transmitted from the user terminal 10 to the remote server 20 and then from the remote server 20 to the manufacturing facility 30), for instance among the following finalization and delivery methods:
ship to an eye care practitioner (for example an eye care practitioner selected by the wearer, in which case the selected eye care practitioner may be identified in the selected preference mentioned above), the new lenses then being edged and mounted to the frame selected by the wearer (see step S26) by this eye care practitioner;
edge and mount the new lenses on the frame selected by the wearer (see step S26) in the manufacturing facility 30 and ship the new optical article (here the new spectacles comprising the new lenses and the frame selected by the wearer) to the wearer.

Figure 5:
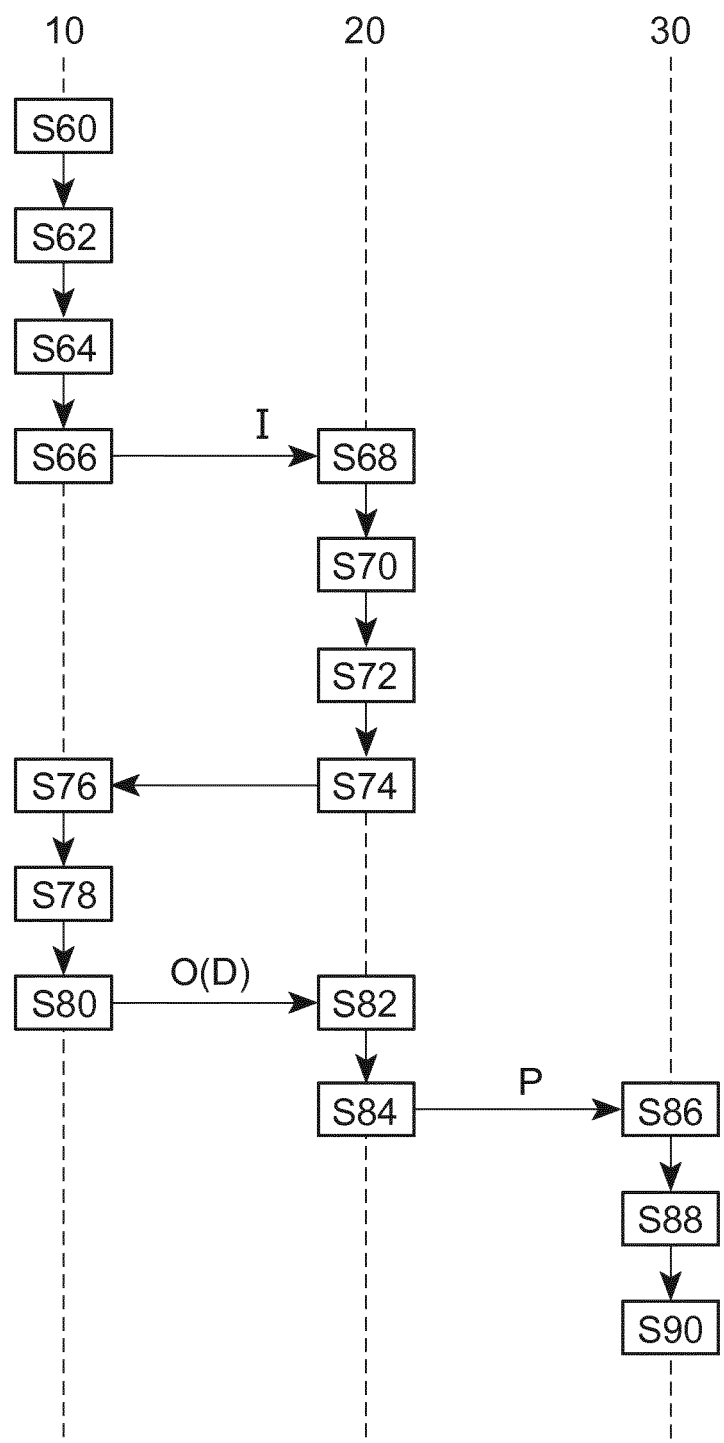
FIG. 5 illustrates the main steps of a method according to a third embodiment of the invention.

FIG. 5 illustrates the main steps of a method according to a third embodiment of the invention.

This method begins at step S60 when a wearer of an initial optical article launches an application (or a website) for upgrading or changing the properties of his/her lenses.

At step S62, the image sensor 18 captures a marking M carried by a lens of the initial optical article, here initial spectacles with initial lenses. As in previous embodiments, the marking M is representative of an identifier I associated with the initial optical article.

The control unit 12 of the user terminal 10 then determines the identifier I based on the captured marking M (step S64).

The identifier I acquired by the user terminal 10 by capturing the marking M is sent to the remote server 20 at step S66.

The remote server 20 (precisely the control unit 22 of the remote server 20) receives the identifier I (via the communication interface 26) at step S68.

The control unit 22 then looks for the identifier I in the database stored in the storage unit 24 and can thus retrieve characteristics C of the initial optical article (step S70), which characteristics C are stored in this database in correspondence with the identifier I.

These characteristics C are for instance characteristics defining ophthalmic lenses carried by the initial optical article. As in previous embodiments, these characteristics may include optical characteristics (such as characteristics defining at least one surface of each of the lenses, or characteristics defining prescription of the wearer such as spherical power, cylindrical power, cylinder axis, here for both eyes) and/or mechanical characteristics (such as dimensions of the lenses, either after edging the lenses or not) and/or characteristics defining the material of the lenses.

The control unit 22 of the remote server 20 can then determine a set of possible changes (step S72) based on the characteristics C of the lenses of the initial optical article (and hence, indirectly, based on the identifier I). Possible changes relate for instance to materials available to produce the lens, to coatings available to deposit on the lens, to sun options, to the brand of the new lenses etc. without however altering the optical correction provided by the concerned lens to the wearer (as defined by at least part of the characteristics C).

The determined possible changes are transmitted from the remote server 20 to the user terminal 10 (step S74) so that these possible changes may be proposed to the wearer by displaying corresponding information on the user interface 15 of the user terminal 10 (step S76).

In view of the possible changes, the wearer can select via the user interface 15 new features for his/her new ophthalmic lenses (step S78).

The user terminal 10 then sends additional data D indicative of the new features (changing features) to the remote server 20 (step S80). This additional data D may for instance be included in an electronic order O for the new lenses transmitted from the user terminal 10 to the remote server 20.

The remote server 20 (and as a consequence the control unit 22 of the remote server 20) receives the additional data D indicative of the changing features at step S82.

The control unit 22 can thus send a message P launching manufacture of the new ophthalmic lenses to the manufacturing facility 30 (step S84).

The message P comprises some of the characteristics C retrieved at step S24 (corresponding to features which were not changed further to selection by the wearer at step S78) and the additional data D indicative of changing features. The computer 32 receives the message P at step S86 and can thus instruct the manufacturing set 38 to produce the new ophthalmic lenses in accordance with the received characteristics and additional data D indicative of changing features (step S88).

Once the new ophthalmic lenses are produced, the computer 32 selects a particular finalization and delivery method (step S90), depending on the concerned ophthalmic lenses and/or on the wearer's preferences (possibly selected by the wearer during step S78, in which case the selected preference may be transmitted from the user terminal 10 to the remote server 20 and then from the remote server 20 to the manufacturing facility 30), for instance among the following finalization and delivery methods:

- ship the produced ophthalmic lenses to an eye care practitioner (for example an eye care practitioner selected by the wearer, in which case the selected eye care practitioner may be identified in the selected preference mentioned above), the new lenses then being edged and mounted to the initial frame of the wearer by this eye care practitioner;
- ship to the wearer (this method being suitable when the new optical article produced by the manufacturing set 38, possibly after edging, can be directly used, i.e. here mounted to the wearer's initial frame);
- await for the wearer's frame such that the new ophthalmic lenses may be edged and then mounted into the wearer's frame in the manufacturing facility 30 before being shipped back to the wearer.

In the various examples described above, the message P is sent to the manufacturing facility 30 to launch production of at least an ophthalmic lens. In other embodiments, the message P could be sent to a repository storing (already manufactured) ophthalmic lenses. Upon receiving the message P comprising characteristics C, an ophthalmic lens having characteristics corresponding to the received characteristics C is selected from the repository and delivered according to one of the possible delivery methods as explained above.

Figure 6:
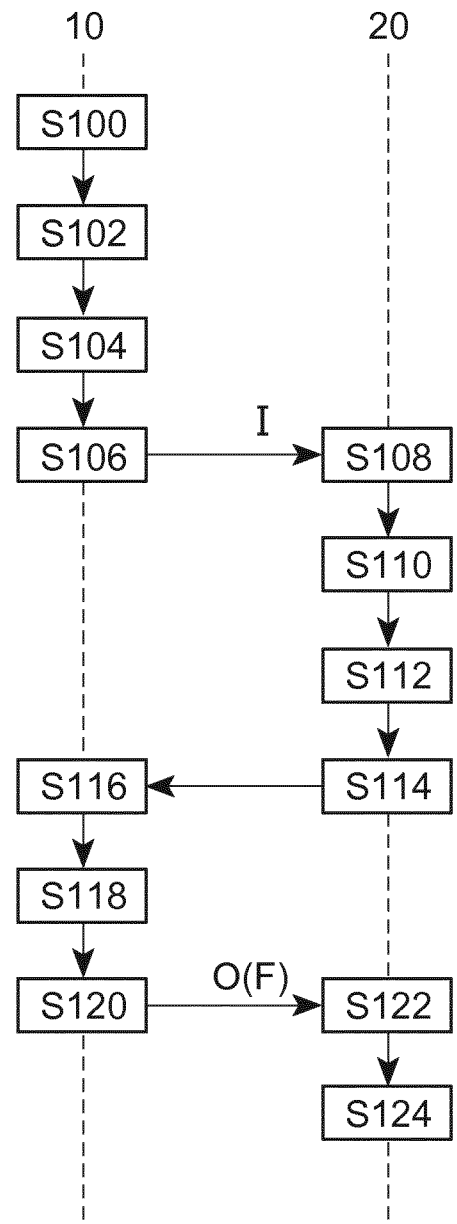
FIG. 6 illustrates the main steps of a method according to a fourth embodiment of the invention.

FIG. 6 illustrates the main steps of a method according to a fourth embodiment of the invention.

This method begins at step S100 when a wearer of an initial optical article launches an application (or a website) for changing frame while keeping the ophthalmic lenses of the initial optical article.

At step S102, the image sensor 18 captures a marking M carried by a lens of the initial optical article, here spectacles with a frame to be changed and ophthalmic lenses to be kept. As in previous embodiments, the marking M is representative of an identifier I associated with the initial optical article.

The control unit 12 of the user terminal 10 then determines the identifier I based on the captured marking M (step S104).

The identifier I acquired by the user terminal 10 by capturing the marking M is sent to the remote server 20 at step S106.

The remote server 20 (precisely the control unit 22 of the remote server 20) receives the identifier I (via the communication interface 26) at step S108. The control unit 22 then looks for the identifier I in the database stored in the storage unit 24 and can thus retrieve characteristics C of the ophthalmic lenses of the initial optical article (step S110), which characteristics C are stored in this database in correspondence with the identifier I.

These characteristics may include optical characteristics (such as characteristics defining at least one surface of each of the lenses, or characteristics defining prescription of the wearer such as spherical power, cylindrical power, cylinder axis, here for both eyes) and/or mechanical characteristics (such as dimensions of the lenses and/or edging shape) and/or characteristics defining the material of the lenses.

The control unit 22 of the remote server 20 can then determine, based on these characteristics C of the lenses of the initial optical article, a list of frames (or frame references) that could fit to these lens characteristics (step S112).

The determined list of possible frames is transmitted from the remote server 20 to the user terminal 10 (step S114) so that these possible frames may be proposed to the wearer by displaying corresponding information on the user interface 15 of the user terminal 10 (step S116).

The wearer can thus select one of these frames via the user interface 15 (step S118).

The user terminal 10 then sends data F designating the selected frame to the remote server 20 (step S120). These data F are for instance included in an electronic order O for the concerned new frame (this electronic order being sent from the user terminal 10 to the remote server 20).

The remote server 20 (and as a consequence the control unit 22 of the remote server 20) receives the data F designating the selected frame at step S122.

The control unit 22 can thus launch a process for delivering the selected frame (directly or indirectly) to the wearer (step S124)

The control unit 22 can select a particular delivery method (for instance depending on the frame to be delivered and/or on the wearer's preferences, possibly given by the wearer during step S118, in which case the wearer's preference may be transmitted from the user terminal 10 to the remote server 20 at step S120), for instance among the following finalization and delivery methods:

ship the new frame to an eye care practitioner (for example an eye care practitioner selected by the wearer, in which case the selected eye care practitioner may be identified in the wearer's preference mentioned above), this eye care practitioner then being in charge of mounting the wearer's existing ophthalmic lens to the new frame;

ship the new frame to the wearer, the wearer then mounting his/her existing ophthalmic lenses on the new frame;

ask the wearer to send his/her existing ophthalmic lenses to predefined premises such that these existing ophthalmic lenses may be mounted into the new frame in these premises and the new optical article (comprising the new frame and existing ophthalmic lenses) may be shipped back to the wearer.

The invention claimed is:

1. A method of ordering a new optical article definable based on features of an initial optical article including at least a lens, said method comprising:
   acquiring an identifier by capturing a marking carried by the lens of the initial optical article;
   sending, by an electronic device, an order for said new optical article including the acquired identifier to a remote server;
   retrieving, by the remote server, characteristics defining the initial optical article based on the identifier;
   determining and transmitting a set of available changing features of the initial optical article to the electronic device, based on the retrieved characteristics;
   receiving, by the remote server, additional data indicative of selected changing features of the set of available changing features of the initial optical article; and
   sending the retrieved characteristics defining the initial optical article with the additional data indicative of the selected changing features,
   wherein the new optical article is defined based on the selected changing features and on part of the features of the initial optical article.

2. The method according to claim 1, further comprising proposing at least one service on a display of the electronic device.

3. The method according to claim 2, wherein the proposing takes place after the sending the identifier.

4. The method according to claim 3, wherein said at least one proposed service is determined based on the identifier.

5. The method according to claim 2, wherein said at least one proposed service is determined based on the identifier.

6. The method according to claim 2, wherein the proposing the at least one service includes proposing a plurality of options for delivery or mounting of said new optical article.

7. The method according to claim 2, further comprising sending additional data defining the new optical article.

8. The method according to claim 1, wherein said selected changing features are determined by input on a user interface of said electronic device.

9. The method according to claim 1, wherein said new optical article includes a frame, and
   wherein said additional data include data designating said frame.

10. The method according to claim 1, wherein the initial optical article includes a pair of ophthalmic lenses including said lens.

11. The method according to claim 1, wherein said marking is a two-dimension code carried by the lens.

12. A method for launching production of a new optical article based on features of an initial optical article including at least a lens, the method comprising:
    receiving, at a remote server, an order for a new optical article including an identifier acquired by capturing a marking carried by the lens of the initial optical article;
    retrieving, by a controller of the remote server, characteristics of the initial optical article stored in a database in correspondence with the identifier, the retrieved characteristics including characteristics defining a prescription of the wearer of the initial optical article;
    determining and transmitting a set of available changing features of the initial optical article, based on the retrieved characteristics;
    receiving, at the remote server, additional data indicative of selected changing features of the set of available changing features of the initial optical article;
    sending the retrieved characteristics defining the initial optical article with the additional data indicative of the selected changing features; and
    launching production of said new optical article in accordance with said retrieved characteristics and the additional data.

13. The method according to claim 12, wherein said characteristics comprise optical characteristics.

14. An apparatus for ordering a new optical article based on features of an initial optical article including at least a lens, said apparatus comprising:
    an image sensor configured to capture a marking carried by the lens of the initial optical article;
    a control unit configured to acquire an identifier based on the captured marking; and
    a communication circuit configured to send an order for said new optical article including the acquired identifier to a remote server, the communication circuit configured to receive a set of available changing features of the initial optical article from the remote server determined based on characteristics defining the initial optical article, based on the identifier, the communication circuit further configured to send additional data indicative of changing features selected from the set of available changing features of the initial optical article, wherein the new optical article is defined based on said selected changing features and on part of said features of the initial optical article.

\* \* \* \* \*